April 12, 1960 B. F. PETERSEN 2,932,387

PHONOGRAPH RECORD EXTRACTOR

Filed April 13, 1959

INVENTOR.
Byron F. Petersen
BY
C. L. Drew
Att'y

United States Patent Office 2,932,387

Patented Apr. 12, 1960

2,932,387

PHONOGRAPH RECORD EXTRACTOR

Byron F. Petersen, Honolulu, Hawaii, assignor of one-fourth to Clayton L. Drew, Corte Madera, Calif.

Application April 13, 1959, Serial No. 806,096

1 Claim. (Cl. 206—56)

This invention relates to improvements in phonograph record extractors.

The principal object of this invention is to provide means for removing and replacing a phonograph record in its container or envelope.

A further object is to provide means for extracting the record from the envelope without contacting the recorded surface with the fingers.

A further object is to produce a device which will extract the record from its envelope without altering the construction of the record or envelope.

A further object is to produce an extractor which may be used over and over again throughout the life of the record.

Other objects and advantages will be apparent during the course of the following description.

In the accompanying drawings forming a part of this specification and in which like numbers are employed to designate like parts throughout the same, Fig. 1 is a perspective view of my invention showing the record within the envelope.

Figures 1, 2, 3, 4, 5:
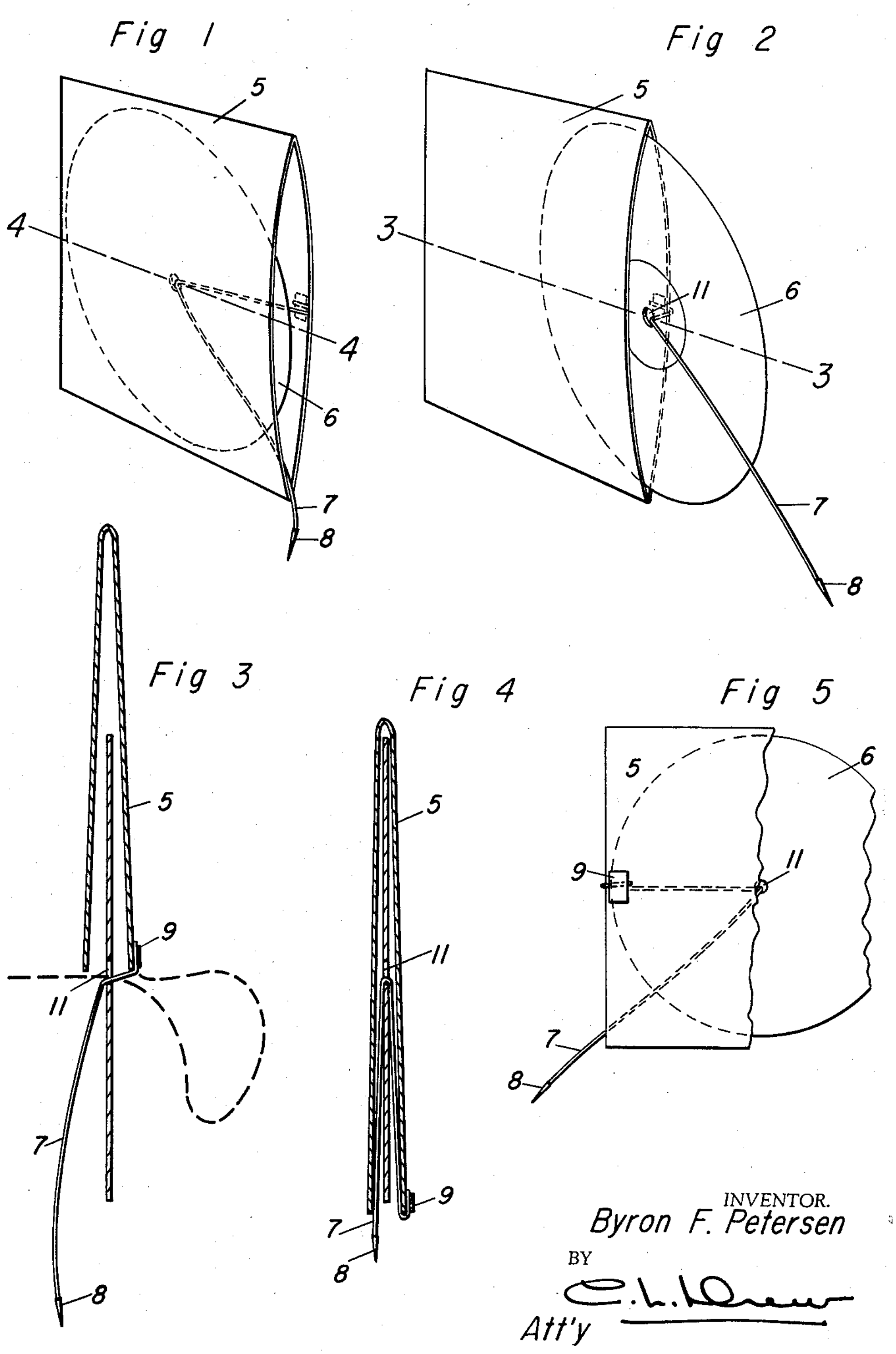
Fig. 2 is a similar view showing the record partially extracted.
Fig. 3 is a cross sectional view taken on the line 3—3 of Fig. 2.
Fig. 4 is a cross sectional view taken on the line 4—4 of Fig. 1.
Fig. 5 is a side elevational view partly broken away to better show the cord through the hole in the record when the record is entirely within the envelope.

Ordinarily phonograph records are enclosed in an open-ended envelope and in order to extract the record from the envelope it is usually necessary to grasp the sides of the record adjacent the edge and pull the record out of the envelope. Oftentimes these records fit the envelope rather snugly and considerable effort is required; consequently, there is always the danger that the surface of the record may be scratched by the finger nails, or dirt deposited in the grooves. Even the oil natural to the skin affects the tone of high fidelity records.

Applicant has, therefore, devised means for removing the record from the envelope to a point where it may be grasped by the edges or by one edge and the center of the record, thus bridging the record grooves and eliminating any possibility of contact therewith which would affect the playing of the record.

In the accompanying drawings, wherein for the purpose of illustration is shown a preferred embodiment of my invention, the numeral 5 designates the envelope as a whole into which the record 6 is placed.

The numeral 7 designates a cord preferably formed of a non-lint bearing material such as nylon and having a tipped end 8, which may be merely a waxed end, the opposite end of the cord being attached to the envelope 5 as shown at 9. This attachment may be either by the use of a sticker or any other desired manner.

The numeral 11 designates the hole in the center of the record 6.

The result of this construction is that in placing the record in the envelope, the record is first partially inserted in the envelope, after which the tip 8 of the cord 7 is passed through the opening 11 of the record and then the record is moved into the envelope from the position shown in Fig. 2 to that shown in Fig. 1.

This act causes the cord to be drawn through the opening and to have its tip remain exposed, as shown in Figs. 1 and 5.

The record and envelope may now be filed for future recording, and when it is desired to again extract the record from the envelope it is merely necessary to pull upon the cord 7 until the record has reached the position shown in Fig. 2.

It is to be here noted that the record is now secured to the envelope by the cord and it cannot fall therefrom. The operator now grasps the record by the edge and the center portion, bridging the grooves or recorded area and further removes the record for use on the phonograph.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A phonograph record package comprising in combination, a phonograph record having a central opening therein and an open ended envelope enclosing said record, a cord secured to one edge of the opening in said envelope and having its free end extending through the center opening in said record enclosed within said envelope, said cord being of sufficient length wherein the free end thereof extends from said opening in said envelope when said record is entirely enclosed in said envelope, said projecting portion of said cord forming a pull tab for removing the record outwardly through the opening in the envelope.

References Cited in the file of this patent

UNITED STATES PATENTS

| | | |
|---|---|---|
| 1,071,679 | Silvertrust | Aug. 26, 1913 |
| 2,047,090 | Woolfson | July 7, 1936 |
| 2,197,066 | Brody | Apr. 16, 1940 |
| 2,718,300 | Goldberg et al. | Sept. 20, 1955 |

FOREIGN PATENTS

| | | |
|---|---|---|
| 190,292 | Switzerland | July 1, 1937 |
| 460,806 | France | Oct. 15, 1913 |